US009936509B2

(12) United States Patent
Morita

(10) Patent No.: US 9,936,509 B2
(45) Date of Patent: Apr. 3, 2018

(54) RADIO COMMUNICATION APPARATUS, PROCESSOR, AND COMMUNICATION CONTROL METHOD

(71) Applicant: KYOCERA CORPORATION, Kyoto (JP)

(72) Inventor: Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/166,959

(22) Filed: May 27, 2016

(65) Prior Publication Data

US 2016/0278071 A1 Sep. 22, 2016

Related U.S. Application Data

(63) Continuation of application No. 14/786,021, filed as application No. PCT/JP2014/060585 on Apr. 14, 2014.

(30) Foreign Application Priority Data

Apr. 24, 2013 (JP) ................................. 2013-091113

(51) Int. Cl.
H04W 28/02 (2009.01)
H04W 48/18 (2009.01)
(Continued)

(52) U.S. Cl.
CPC ........... *H04W 72/048* (2013.01); *H04W 8/24* (2013.01); *H04W 28/0252* (2013.01);
(Continued)

(58) Field of Classification Search
CPC ..... H04W 76/02; H04W 48/06; H04W 88/06; H04W 52/0219; H04W 72/0413; H04W 72/0406; H04L 5/0025
See application file for complete search history.

(56) References Cited

U.S. PATENT DOCUMENTS 9,008,065 B2   4/2015  Purkayastha et al.
2009/0046596 A1  2/2009 Ewe et al.
(Continued)

FOREIGN PATENT DOCUMENTS

EP    1875763 A1    1/2008
JP    2008-61266 A  3/2008
(Continued)

OTHER PUBLICATIONS

An Office Action; "Notice of Reasons for Rejection," issued by the Japanese Patent Office on May 31, 2016, which corresponds to Japanese Patent Application No. 2016-040627 and is related to U.S. Appl. No. 15/166,959; with English language statement of relevance.

(Continued)

*Primary Examiner* — Andrew Chriss
*Assistant Examiner* — Peter Mak
(74) *Attorney, Agent, or Firm* — Studebaker & Brackett PC

(57) ABSTRACT

A radio communication apparatus according to a first aspect is an apparatus for supporting cellular communication and wireless LAN communication. A protocol stack for the cellular communication includes: a cellular lower layer including a physical layer and a MAC layer; and a cellular upper layer higher than the MAC layer. The radio communication apparatus comprises a controller configured to set a specific mode using a protocol stack of the wireless LAN communication instead of the cellular lower layer.

14 Claims, 5 Drawing Sheets

(51) Int. Cl.
  *H04W 72/04* (2009.01)
  *H04W 84/12* (2009.01)
  *H04W 88/10* (2009.01)
  *H04W 8/24* (2009.01)
  *H04W 88/06* (2009.01)
  *H04W 84/04* (2009.01)
  *H04L 29/12* (2006.01)
  *H04W 76/02* (2009.01)

(52) U.S. Cl.
  CPC ......... *H04W 48/18* (2013.01); *H04L 61/2038* (2013.01); *H04W 76/021* (2013.01); *H04W 84/042* (2013.01); *H04W 84/12* (2013.01); *H04W 88/06* (2013.01); *H04W 88/10* (2013.01)

(56) References Cited

U.S. PATENT DOCUMENTS

| | | | | |
|---|---|---|---|---|
| 2009/0131053 | A1* | 5/2009 | Sachs | H04W 36/0016 455/436 |
| 2010/0279672 | A1 | 11/2010 | Koskela et al. | |
| 2013/0083661 | A1* | 4/2013 | Gupta | H04W 28/0215 370/235 |
| 2013/0088983 | A1 | 4/2013 | Pragada et al. | |
| 2014/0050086 | A1* | 2/2014 | Himayat | H04N 21/2365 370/230 |
| 2014/0140335 | A1* | 5/2014 | Wang | H04W 28/08 370/338 |
| 2015/0264726 | A1* | 9/2015 | Zhu | H04W 84/12 370/329 |
| 2016/0105844 | A1 | 4/2016 | Morita | |

FOREIGN PATENT DOCUMENTS

| | | |
|---|---|---|
| JP | 2010-536292 A | 11/2010 |
| JP | 2014-216743 A | 11/2014 |
| WO | 2013040028 A2 | 3/2013 |

OTHER PUBLICATIONS

International Search Report and Written Opinion of the International Searching Authority, PCT/JP2014/060585, Jul. 15, 2014.
3GPP TSG-RAN Meeting #57, RP-1201455, "New Study Item Proposal on WLAN/3GPP Radio Interworking", Sep. 13-15, 2012.
An Office Action; "Notice of Reasons for Rejection," issued by the Japanese Patent Office on Nov. 24, 2015, which corresponds to Japanese Patent Application No. 2013-091113 and is related to U.S. Appl. No. 14/786,021; with English language statement of relevance.
An Office Action issued by the Japanese Patent Office dated Sep. 27, 2016, which corresponds to Japanse Patent Application No. 2016-040627; with Concise Statement of Relevance; 6pp.
The extended European search report issued by the European Patent Office dated Sep. 12, 2016, which corresponds to European Patent Application No. 14788836.6-1854 and is related to U.S. Appl. No. 15/166,959.
An Office Action; "Notice of Reasons for Rejection," issued by the Japanese Patent Office dated Feb. 28, 2017, which corresponds to Japanese Patent Application No. 2016-040627 and is related to U.S. Appl. No. 15/166,959; with English language statement of relevance.
Communication pursuant to Article 94(3) EPC issued by the European Patent Office dated Jun. 28, 2017, which corresponds to European Patent Application No. 14 788 836.6-1854 and is related to U.S. Appl. No. 15/166,959.

\* cited by examiner

RADIO COMMUNICATION APPARATUS, PROCESSOR, AND COMMUNICATION CONTROL METHOD

TECHNICAL FIELD

The present invention relates to a radio communication apparatus, a processor, and a communication control method which are used in a cellular communication system.

BACKGROUND ART

In recent years, user terminals (so-called dual terminals) for supporting cellular communication and wireless LAN communication have been widely used. Further, wireless LAN access points (which will be simply called "access point" below) managed by an operator of a cellular communication system have increased.

Thus, there will be considered a technique capable of enhancing a cooperation between a cellular communication system and a wireless LAN system in the 3GPP (3rd Generation Partnership Project) as a standard project of the cellular communication systems (see Non-Patent Literature 1).

CITATION LIST

Non Patent Literature

Non Patent Literature 1: 3GPP Contribution RP-1201455

SUMMARY OF INVENTION

For example, traffics exchanged between a user terminal and a base station in cellular communication are switched to be exchanged between a user terminal and an access point in wireless LAN communication, thereby reducing (offloading) traffic loads in a cellular communication system.

However, when such switching is performed, various settings for starting wireless LAN communication need to be performed between the user terminal and the access point. Therefore, the cellular communication system is difficult to offload rapidly.

It is therefore an object of the present invention to provide a radio communication apparatus, a processor, and a communication control method which are capable of rapidly offloading a cellular communication system.

A radio communication apparatus according to a first aspect is an apparatus for supporting cellular communication and wireless LAN communication. A protocol stack for the cellular communication includes: a cellular lower layer including a physical layer and a MAC layer; and a cellular upper layer higher than the MAC layer. The radio communication apparatus comprises a controller configured to set a specific mode using a protocol stack of the wireless LAN communication instead of the cellular lower layer.

A processor according to a second aspect is provided in a radio communication apparatus for supporting cellular communication and wireless LAN communication. A protocol stack for the cellular communication includes: a cellular lower layer including a physical layer and a MAC layer; and a cellular upper layer higher than the MAC layer. The processor sets a specific mode using a protocol stack of the wireless LAN communication instead of the cellular lower layer.

A communication control method according to a third aspect is used in a radio communication apparatus for supporting cellular communication and wireless LAN communication. A protocol stack for the cellular communication includes: a cellular lower layer including a physical layer and a MAC layer; and a cellular upper layer higher than the MAC layer. The communication control method comprises a step of setting a specific mode using a protocol stack of the wireless LAN communication instead of the cellular lower layer.

DESCRIPTION OF EMBODIMENTS

Overview of Embodiment

A radio communication apparatus according to embodiments is an apparatus for supporting cellular communication and wireless LAN communication. A protocol stack for the cellular communication includes: a cellular lower layer including a physical layer and a MAC layer; and a cellular upper layer higher than the MAC layer. The radio communication apparatus comprises a controller configured to set a specific mode using a protocol stack of the wireless LAN communication instead of the cellular lower layer.

In the embodiments, the controller selects either the specific mode using the cellular upper layer or a normal mode not using the cellular upper layer, as a mode for the wireless LAN communication.

In the embodiments, when traffics exchanged in the wireless LAN communication are directed to switch from the cellular communication to the wireless LAN communication, the controller selects the specific mode.

In the embodiments, when traffics exchanged in the wireless LAN communication are not directed to switch from the cellular communication to the wireless LAN communication, the controller selects the normal mode.

In the embodiments, the cellular upper layer includes a RLC (Radio Link Control) layer.

In the embodiments, the cellular upper layer includes a PDCP (Packet Data Convergence Protocol) layer.

A processor according to embodiments is provided in a radio communication apparatus for supporting cellular communication and wireless LAN communication. A protocol stack for the cellular communication includes: a cellular lower layer including a physical layer and a MAC layer; and a cellular upper layer higher than the MAC layer. The processor sets a specific mode using a protocol stack of the wireless LAN communication instead of the cellular lower layer.

A communication control method according to embodiments is used in a radio communication apparatus for supporting cellular communication and wireless LAN communication. A protocol stack for the cellular communication includes: a cellular lower layer including a physical layer and a MAC layer; and a cellular upper layer higher than the MAC layer. The communication control method comprises a step of setting a specific mode using a protocol stack of the wireless LAN communication instead of the cellular lower layer.

Embodiment

Each embodiment in which a cellular communication system (LTE system) configured conforming to the 3GPP standard is associated with a wireless LAN (WLAN) system will be described below with reference to the drawings.

(1) Entire Configuration

Figure 1:
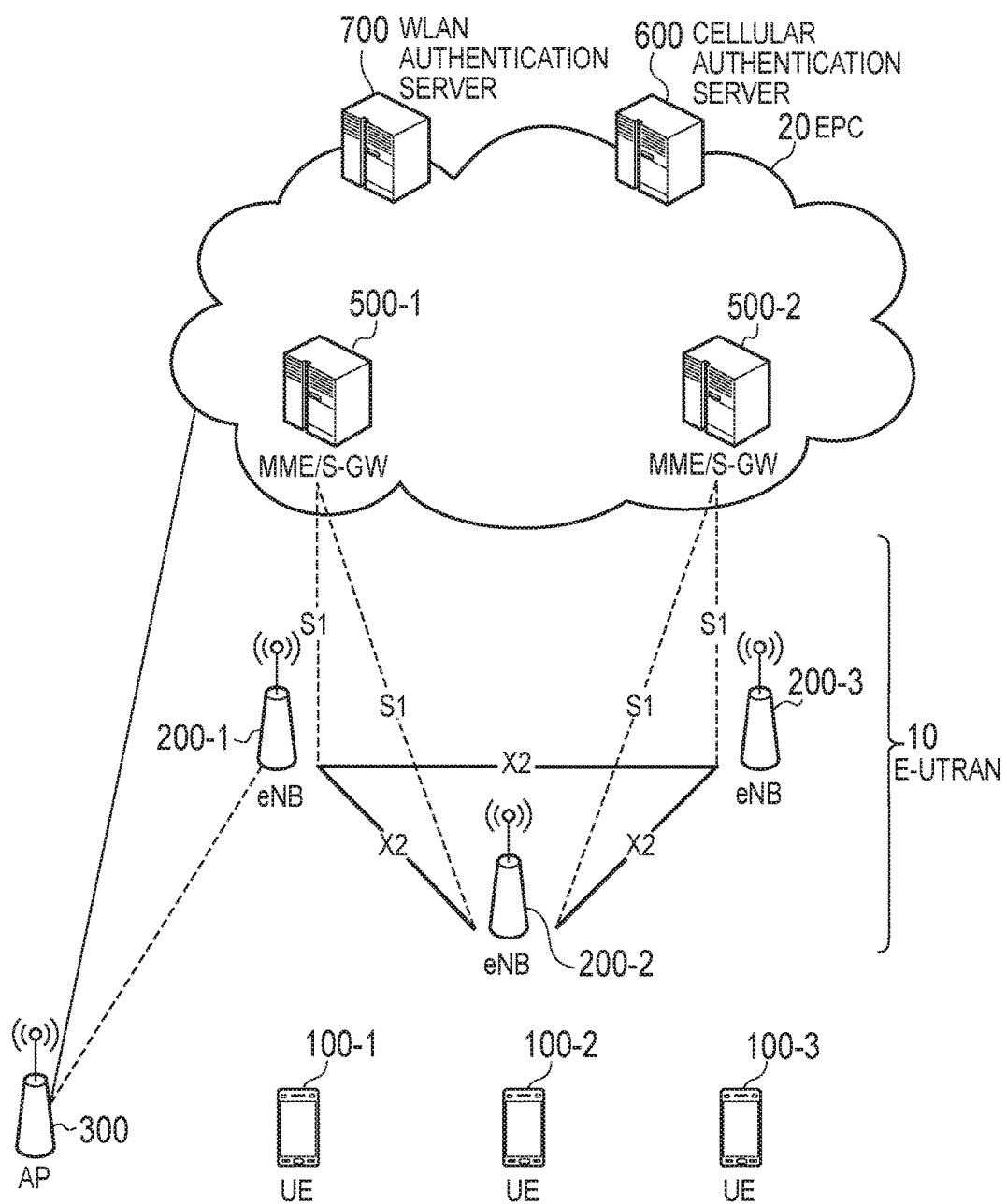
FIG. 1 is a system configuration diagram according to an embodiment.

FIG. 1 is a system configuration diagram according to the embodiment. As illustrated in FIG. 1, the cellular communication system includes a plurality of UEs (User Equipments) 100, E-UTRAN (Evolved-UMTS Terrestrial Radio Access Network) 10, and EPC (Evolved Packet Core) 20. The E-UTRAN 10 corresponds to a radio access network. The EPC 20 corresponds to a core network.

The UE 100 is a mobile radio communication apparatus and performs radio communication with a cell with which a connection is established. The UE 100 corresponds to a user terminal. The UE 100 is a terminal (dual terminal) that supports both communication schemes of cellular communication and WLAN communication.

The E-UTRAN 10 includes a plurality of eNBs 200 (evolved Node-Bs). The eNB 200 is fixed radio communication apparatus and corresponds to a base station (cellular base station). The eNB 200 manages one or a plurality of cells and performs radio communication with the UE 100 which establishes a connection with the cell of the eNB 200. It is noted that the "cell" is used as a term indicating a minimum unit of a radio communication area, and is also used as a term indicating a function of performing radio communication with the UE 100. Further, the eNB 200, for example, has a radio resource management (RRM) function, a routing function of user data, and a measurement control function for mobility control and scheduling.

The eNBs 200 are connected mutually via an X2 interface. Further, the eNB 200 is connected to MME/S-GW 500 included in the EPC 20 via an S1 interface.

The EPC 20 includes a plurality of MME (Mobility Management Entity)/S-GWs (Serving-Gateways) 500. The MME is a network node that performs various mobility controls and the like, for the UE 100 and corresponds to a control station. The S-GW is a network node that performs transfer control of user data and corresponds to a switching station.

The WLAN system includes WLAN AP (hereinafter referred to as "AP") 300. The WLAN system is configured to be in compliance with various IEEE 802.11 specifications, for example. The AP 300 communicates with the UE 100 in a frequency band (WLAN frequency band) different from a cellular frequency band. The AP 300 is connected to the EPC 20 via a router, etc.

However, it is not limited to the case in which the eNB 200 and the AP 300 are individually collocated. The eNB 200 and the AP 300 may also be collocated at the same place. The eNB 200 and the AP 300 may be directly connected to each other through an arbitrary interface of an operator.

The EPC 20 further includes a cellular authentication server 600 for performing an authentication for UE 100 in the cellular communication system, and a WLAN authentication server 700 for performing an authentication for UE 100 in the WLAN system. When the authentication by the cellular authentication server 600 is succeeded, the UE 100 can connect to the cellular communication system. When the authentication by the WLAN authentication server 700 is succeeded, the UE 100 can connect to the WLAN system.

(2) Hardware Configuration of UE 100

Figure 2:
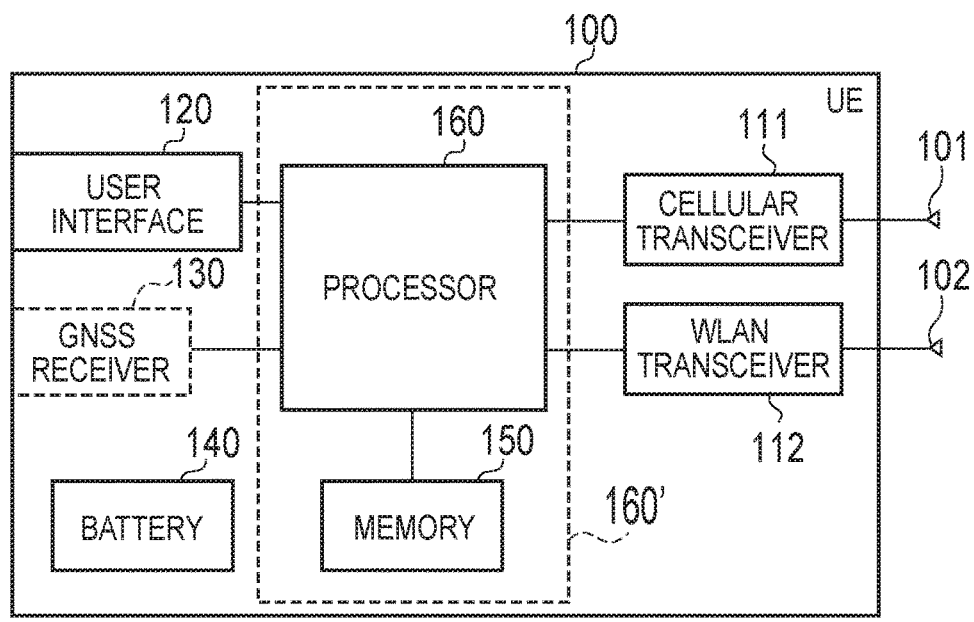
FIG. 2 is a diagram illustrating a hardware block of UE (User terminal) according to the embodiment.

FIG. 2 is a hardware block diagram of the UE 100. As illustrated in FIG. 2, the UE 100 includes: antennas 101 and 102; a cellular transceiver 111; a WLAN transceiver 112; a user interface 120; a GNSS (Global Navigation Satellite System) receiver 130; a battery 140; a memory 150; and a processor 160. The memory 150 and the processor 160 constitute a control unit. The UE 100 may not have the GNSS receiver 130. Furthermore, the memory 150 may be integrally formed with the processor 160, and this set (that is, a chipset) may be called a processor 160'.

The antenna 101 and the cellular transceiver 111 are used for transmitting and receiving cellular radio signals. The cellular transceiver 111 converts a baseband signal output from the processor 160 into the cellular radio signal, and transmits the same from the antenna 101. Further, the cellular transceiver 111 converts the cellular radio signal received by the antenna 101 into the baseband signal, and outputs the same to the processor 160.

The antenna 102 and the WLAN transceiver 112 are used for transmitting and receiving WLAN radio signals. The WLAN transceiver 112 converts the baseband signal output from the processor 160 into a WLAN radio signal, and transmits the same from the antenna 102. Further, the WLAN transceiver 112 converts the WLAN radio signal received by the antenna 102 into a baseband signal, and outputs the same to the processor 160.

A MAC address (hereinafter referred to as "WLAN MAC-ID") is allocated to the WLAN transceiver 112, as an identifier of the UE 100 in the WLAN system. The WLAN MAC-ID is included in WLAN radio signals transmitted and received by the WLAN transceiver 112.

The user interface 120 is an interface with a user carrying the UE 100, and includes, for example, a display, a microphone, a speaker, and various buttons. Upon receipt of the input from a user, the user interface 120 outputs a signal indicating a content of the input to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for processes by the processor 160. The processor 160 includes a baseband processor that performs modulation and demodulation, encoding and decoding and the like on the baseband signal and a CPU that performs various processes by executing the program stored in the memory 150. The processor 160 may further include a codec that performs encoding and decoding on audio and video signals. The processor 160 executes various processes and various communication protocols described later.

(3) Hardware Configuration of ENB 200

Figure 3:
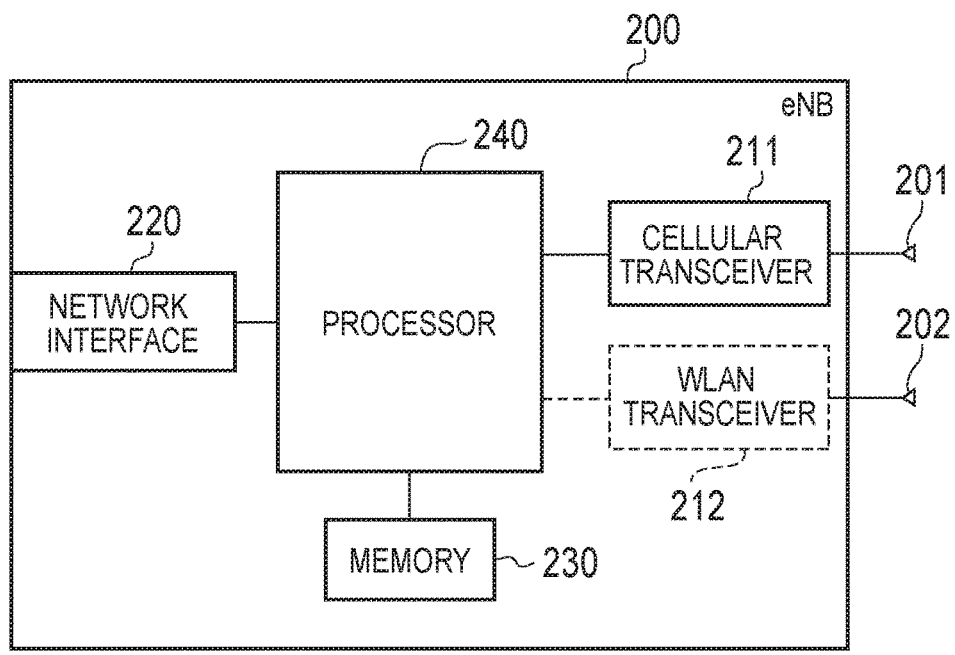
FIG. 3 is a diagram illustrating a hardware block of an eNB (base station) according to the embodiment.

FIG. 3 is a hardware block diagram of the eNB 200. As illustrated in FIG. 3, the eNB 200 includes an antenna 201, a cellular transceiver 211, a network interface 220, a memory 230, and a processor 240. The memory 230 and the processor 240 constitute a control unit. The memory 230 and the processor 240 constitute a control unit. Furthermore, the memory 230 may be integrally formed with the processor 240, and this set (that is, a chipset) may be called a processor.

The antenna 201 and the cellular transceiver 211 are used for transmitting and receiving a cellular radio signal. The cellular transceiver 211 converts the baseband signal output from the processor 240 into the cellular radio signal, and transmits the same from the antenna 201. Furthermore, the cellular transceiver 211 converts the cellular radio signal received by the antenna 201 into the baseband signal, and outputs the same to the processor 240.

The network interface 220 is connected to the neighboring eNB 200 via an X2 interface and is connected to the MME/S-GW 500 via the S1 interface. Further, the network interface 220 is used for communication with the AP 300 via the EPC 20.

The memory 230 stores a program to be executed by the processor 240 and information to be used for a process by the processor 240. The processor 240 includes a baseband processor that performs modulation and demodulation, encoding and decoding and the like on the baseband signal and a CPU that performs various processes by executing the program stored in the memory 230. The processor 240 implements various processes and various communication protocols described later.

Collocated-based eNB 200 may include functions of AP 300. In this case, the eNB 200 further includes an antenna 202 and a WLAN transceiver 212 which are used for transmitting and receiving WLAN radio signals. The WLAN transceiver 212 converts the baseband signal output from the processor 240 into the cellular radio signal, and transmits the same from the antenna 202. Furthermore, the WLAN transceiver 212 converts the cellular radio signal received by the antenna 202 into the baseband signal, and outputs the same to the processor 240.

(4) Hardware Configuration of AP 300

Figure 4:
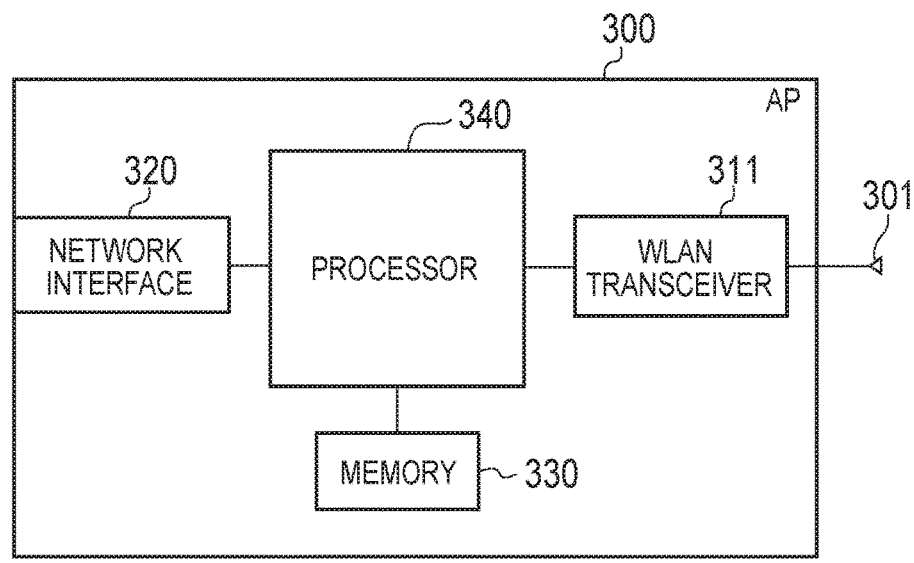
FIG. 4 is a diagram illustrating a hardware block of an AP (access point) according to the embodiment.

FIG. 4 is a hardware block diagram of the AP 300. As illustrated in FIG. 4, the AP 300 includes an antenna 301, a WLAN transceiver 311, a network interface 320, a memory 330, and a processor 340.

The antenna 301 and the WLAN transceiver 311 are used for transmitting and receiving WLAN radio signals. The WLAN transceiver 311 converts the baseband signal output from the processor 340 into the WLAN radio signal and transmits the same from the antenna 301. Further, the WLAN transceiver 311 converts the WLAN radio signal received by the antenna 301 into the baseband signal and outputs the same to the processor 340.

The network interface 320 is connected to the EPC 20 via a router, etc. Further, the network interface 320 is used for communication with the eNB 200 via the EPC 20.

The memory 330 stores a program to be executed by the processor 340 and information to be used for a process by the processor 340. The processor 340 includes a baseband processor that performs modulation and demodulation, encoding and decoding and the like on the baseband signal and a CPU that performs various processes by executing the program stored in the memory 330.

(5) Cellular Protocol Stack

Figure 5:
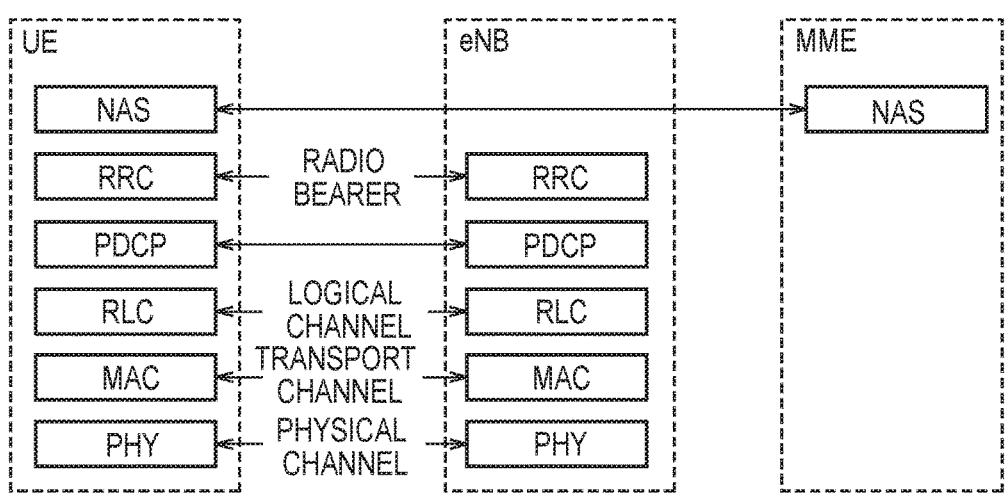
FIG. 5 is a protocol stack diagram of a radio interface in a cellular communication system according to the embodiment.

FIG. 5 is a protocol stack diagram of a radio interface in the cellular communication system. As illustrated in FIG. 5, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs priority control of data, and a retransmission process and the like by hybrid ARQ (HARQ). Between the MAC layer of the UE 100 and the MAC layer of the eNB 200, data is transmitted via a transport channel. The MAC layer of the eNB 200 includes a scheduler that selects a transport format (a transport block size, a modulation and coding scheme and the like) of an uplink and a downlink, and an assigned resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in a connected state (RRC connected state), otherwise, the UE 100 is in an idle state (RRC idle state).

A NAS (Non-Access Stratum) layer positioned above the RRC layer performs session management, mobility management and the like.

(6) Software Configuration of Collocated-Based ENB 200

A software configuration of a Collocated-based eNB 200 will be described below. As described above, the Collocated-based eNB 200 includes not only the cellular transceiver 211 but also the WLAN transceiver 212 in the hardware configuration.

Figure 6:
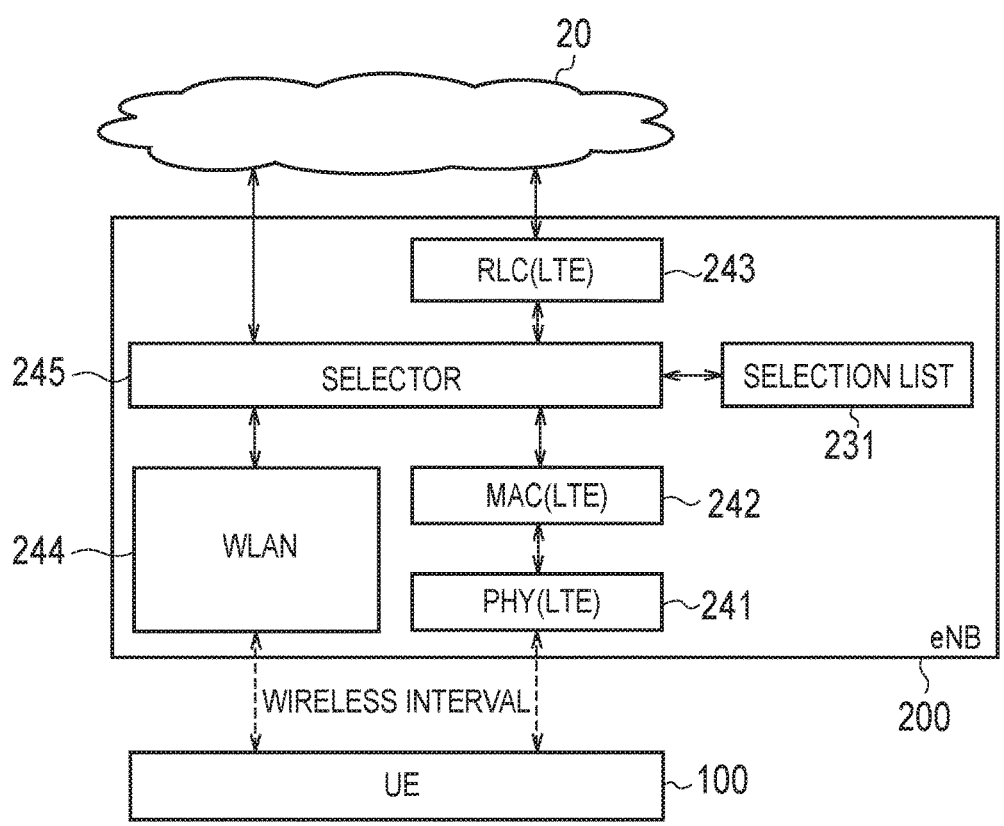
FIG. 6 is a diagram illustrating a software block of an eNB according to the embodiment.

FIG. 6 is a diagram illustrating a software block of the eNB 200.

As illustrated in FIG. 6, the eNB 200 performs a processing of relaying traffics (user data) between the EPC 20 and the UE 100. The processor 240 in the eNB 200 performs cellular communication protocol stack. The cellular communication protocol stack includes a physical layer 241, a MAC layer 242, and a RLC layer 243. As described above, the cellular communication protocol stack further includes a PDCP layer (and a RRC layer). According to the embodiment, the physical layer 241 and the MAC layer 242 configures a cellular lower layer, and the RLC layer 243 and the PDCP layer configures a cellular upper layer.

In the cellular communication uplink, user data received by the cellular transceiver 211 in the eNB 200 from the UE 100 is processed in the physical layer 241, the MAC layer 242, the RLC layer 243, and the PDCP layer in this order, and then is transmitted to the EPC 20 via the network interface 220. On the other hand, in the cellular communication downlink, user data received by the network interface 220 in the eNB 200 from the EPC 20 is processed in the PDCP layer, the RLC layer 243, the MAC layer 242, and the physical layer 241 in this order, and then is transmitted to the UE 100 via the cellular transceiver 211.

The processor 240 in the eNB 200 further performs WLAN communication protocol stack (WLAN protocol stack) 244. The WLAN protocol stack 244 includes the physical layer and the MAC layer.

Generally, in the WLAN communication uplink, user data received by the WLAN transceiver 212 in the eNB 200 from the UE 100 is processed in the WLAN protocol stack 244, and then is transmitted to the EPC 20 via the network interface 220. On the other hand, in the WLAN communication downlink, user data received by the network interface 220 in the eNB 200 from the EPC 20 is processed in the WLAN protocol stack 244, and then is transmitted to the UE 100 via the WLAN transceiver 212. Such a general WLAN communication mode will be called "normal mode."

The processor 240 in the eNB 200 further executes the function of a selector 245 configured to select either the normal mode or the offload mode (specific mode) as a mode of setting WLAN communication. Here, "offload mode" is a mode using the WLAN protocol stack 244 instead of the cellular lower layer (the physical layer 241 and the MAC layer 242).

The selector 245 selects either the normal mode or the offload mode with reference to a selection list 231 stored in the memory 230 in the eNB 200. The selection list 231 is a list recording therein WLAN MAC-IDs of the UE 100 to which the offload mode is to be applied. For example, when WLAN MAC-ID included in the uplink data processed in the WLAN protocol stack 244 is present in the selection list 231, the selector 245 passes the uplink data to the cellular upper layer (the RLC layer 243 and the PDCP layer).

In the offload mode, in the WLAN communication uplink, user data received by the WLAN transceiver 212 in the eNB 200 from the UE 100 is processed in the WLAN protocol stack 244, then in the cellular upper layer (the RLC layer 243 and the PDCP layer), and then is transmitted to the EPC 20 via the network interface 220. On the other hand, in the WLAN communication downlink, user data received by the network interface 220 in the eNB 200 from the EPC 20 is processed in the cellular upper layer (the RLC layer 243 and the PDCP layer), then in the WLAN protocol stack 244, and then is transmitted to the UE 100 via the WLAN transceiver 212.

In this way, the cellular upper layer is used in the offload mode, and thus the EPC 20 recognizes that the eNB 200 is making cellular communication although the eNB 200 is making WLAN communication. Therefore, when cellular communication is switched to WLAN communication (offload mode), authentication by the WLAN authentication server 700 can be omitted.

(7) Software Configuration of UE 100

Figure 7:
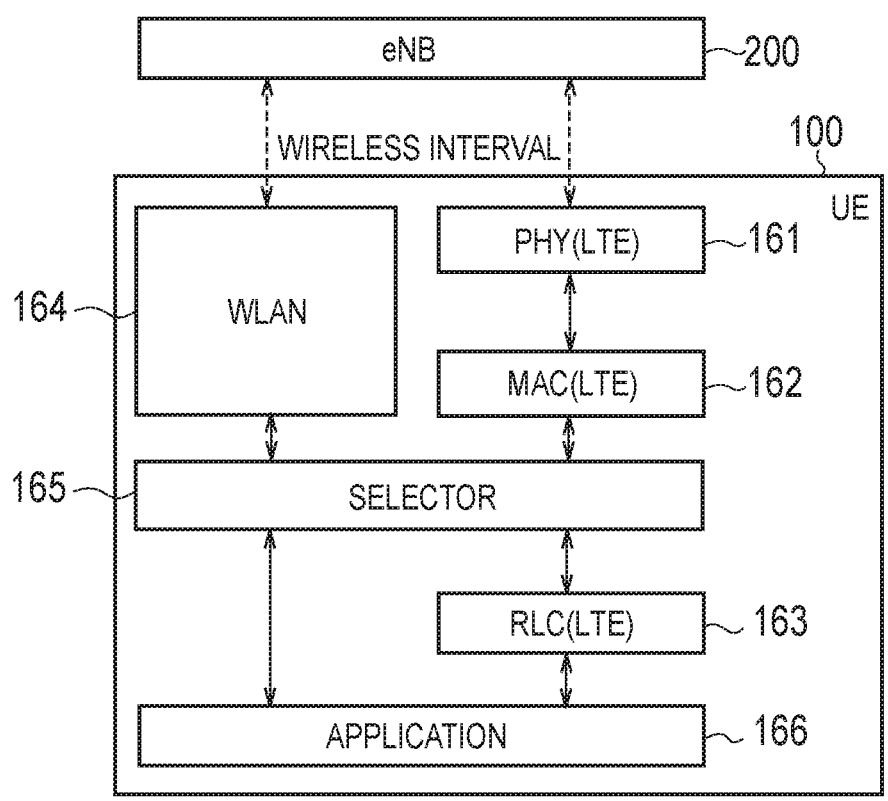
FIG. 7 is a diagram illustrating a software block of a UE according to the embodiment.

FIG. 7 is a diagram illustrating a software block of the UE 100. As illustrated in FIG. 7, the processor 160 in the UE 100 executes an application 166 configured to exchange traffics (user data) with the EPC 20 via the eNB 200.

Further, the processor 160 in the UE 100 performs cellular communication protocol stack. The cellular communication protocol stack includes a physical layer 161, a MAC layer 162, and a RLC layer 163. As described above, the cellular communication protocol stack further includes a PDCP layer (and a RRC layer). According to the embodiment, the physical layer 161 and the MAC layer 162 configures a cellular lower layer, and the RLC layer 163 and the PDCP layer configures a cellular upper layer.

In the cellular communication uplink, user data generated in the application 166 is processed in the PDCP layer, the RLC layer 163, the MAC layer 162, and the physical layer 161 in this order, and then is transmitted to the eNB 200 via the cellular transceiver 111. On the other hand, in the cellular communication downlink, user data received by the cellular transceiver 111 in the UE 100 from the eNB 200 is processed in the physical layer 161, the MAC layer 162, the RLC layer 163, and the PDCP layer in this order, and then is passed to the application 166.

The processor 160 in the UE 100 performs WLAN communication protocol stack (WLAN protocol stack) 164. The WLAN protocol stack 164 includes the physical layer and the MAC layer.

Generally, in the WLAN communication uplink, user data generated in the application 166 is processed in the WLAN protocol stack 164, and then is transmitted to the eNB 200 via the WLAN transceiver 112. On the other hand, in the WLAN communication downlink, user data received by the WLAN transceiver 112 in the UE 100 from the eNB 200 is processed in the WLAN protocol stack 164, and then is passed to the application 166. Such a general WLAN communication mode will be called "normal mode."

The processor 160 in the UE 100 further executes the function of a selector 165 configured to select either the normal mode or the offload mode (specific mode) as a mode of setting WLAN communication. Here, "offload mode" is a mode using the WLAN protocol stack 164 instead of the cellular lower layer (the physical layer 161 and the MAC layer 162). The selector 165 selects either the normal mode or the offload mode depending on whether it is in the offload.

In the offload mode, in the WLAN communication uplink, user data generated in the application 166 is processed in the cellular upper layer (the RLC layer 163 and the PDCP layer), then in the WLAN protocol stack 164, and then is transmitted to the eNB 200 via the WLAN transceiver 112. On the other hand, in the WLAN communication downlink, user data received by the WLAN transceiver 112 in the UE 100 from the eNB 200 is processed in the WLAN protocol stack 164, then in the cellular upper layer (the RLC layer 163 and the PDCP layer), and then is passed to the application 166.

(8) Operation According to Embodiment

The operations of the eNB 200 illustrated in FIG. 6 and the UE 100 illustrated in FIG. 7 will be described below. There will be described herein the operations when traffics exchanged between the UE 100 and the eNB 200 via cellular communication are switched for WLAN communication thereby to offload cellular communication.

In the first step, the eNB 200 and the UE 100 make cellular communication. Specifically, the eNB 200 and the UE 100 exchange uplink and downlink traffics.

In the second step, when a load level in cellular communication exceeds a threshold, for example, the eNB 200 decides to offload from cellular to WLAN. Here, a load level in cellular communication indicates traffic load in cellular communication, radio resource using rate in cellular communication, or the like.

In the third step, the eNB 200 transmits an offload command of instructing to offload from cellular to WLAN to the UE 100. When the UE 100 exchanges a plurality of kinds of traffics (a plurality of bearers) with the eNB 200, the eNB 200 may include a traffic type (bearer identification information) to be offloaded in the offload command.

In the fourth step, the UE 100 selects the offload mode and starts WLAN communication with the eNB 200 in response to reception of the offload command. When the WLAN transceiver 112 is in the OFF state on reception of the offload command, the UE 100 preferably switches the WLAN transceiver 112 to the ON state. The eNB 200 selects the offload mode and starts WLAN communication with the UE 100 in response to transmission of the offload command.

As described above, in the offload mode, the lower layer is switched to WLAN, but the upper layer is passed over to cellular. In the offload mode, the EPC 20 recognizes that the eNB 200 is making cellular communication. Therefore, the eNB 200 and the UE 100 can smoothly (seamlessly) switch from cellular communication to WLAN communication without complicated settings.

(9) Conclusion

The eNB 200 and the UE 100 set the offload mode using the WLAN protocol stack instead of the cellular lower layer, respectively. Thereby, the eNB 200 and the UE 100 can seamlessly switch from cellular communication to WLAN communication without complicated settings.

According to the embodiment, the eNB 200 and the UE 100 select either the offload mode using the cellular upper layer or the normal mode not using the cellular upper layer as a mode for WLAN communication. Specifically, when traffics exchanged in WLAN communication are directed to switch from cellular communication to WLAN communication, the offload mode is selected. On the other hand, when traffics exchanged in WLAN communication are not directed to switch from cellular communication to WLAN communication, the normal mode is selected. Thereby, a mode for WLAN communication can be appropriately set.

According to the embodiment, the cellular upper layer includes the RLC layer and the PDCP layer. Thus, when cellular communication is switched to WLAN communication (offload mode), the respective settings of the RLC layer and the PDCP layer can be passed over to WLAN communication, thereby seamlessly switching from cellular communication to WLAN communication.

Other Embodiments

A type of the Collocated-based eNB 200 has not particularly been noted in the above embodiment, but the Collocated-based eNB 200 is preferably a micro-cell base station (such as home base station) configured to manage as small a cell as a coverage of the AP 300. The cellular coverage and the WLAN coverage are overlapped on each other, thereby smoothly offloading from cellular to WLAN.

The above embodiment assumes that the UE 100 supports WLAN communication. However, the UE 100 not supporting WLAN communication is also present, and thus when starting cellular communication or when being requested from the eNB 200, the UE 100 may transmit information as to whether to support WLAN communication to the eNB 200.

According to the above embodiment, the mode using the WLAN protocol stack instead of the cellular lower layer is called offload mode and is used to offload from cellular to WLAN. However, such a mode may be used to applications other than offloading.

The cellular communication system has been described by way of LTE system according to the above embodiment, but is not limited to the LTE system and the present invention may be applied to systems other than the LTE system.

The entire contents of Japanese Patent Application NO. 2013-091113 (filed on Apr. 24, 2013) are incorporated herein by reference.

INDUSTRIAL APPLICABILITY

The present invention is useful in the field of radio communication.

The invention claimed is:

1. A radio base station for supporting cellular communication and wireless local area network (WLAN) communication, wherein
a protocol stack for the cellular communication includes:
a cellular lower layer including a physical layer and a medium access control (MAC) layer; and a cellular upper layer higher than the MAC layer, wherein the cellular upper layer includes a packet data convergence protocol (PDCP) layer,
the radio base station comprises:
a cellular radio transceiver configured to transmit/receive cellular radio signals to/from a user terminal,
storage configured to store a plurality of WLAN-related identifiers; and
a controller configured to:
set a specific mode in which the PDCP layer of the cellular upper layer transmits or receives data to/from the user terminal via a protocol stack of the WLAN communication,
transmit, to the user terminal via the cellular radio transceiver, bearer identification information that specifies a bearer to which the specific mode should be applied,
receive the data from the user terminal via the protocol stack of the WLAN communication,
determine whether the specific mode is applied to the received data based on whether a WLAN-related identifier included in the received data matches with a WLAN identifier of the plurality of WLAN-related identifiers stored in the storage, wherein the WLAN-related identifier included in the received data is used for the WLAN communication, and
in response to the specific mode being applied to the received data, process the received data at the PDCP layer.

2. The radio base station according to claim 1, wherein the controller selects either the specific mode using the cellular upper layer or a normal mode not using the cellular upper layer, as a mode for the WLAN communication.

3. The radio base station according to claim 1, wherein the controller receives capability information related to the WLAN communication of a user terminal with which the radio base station communicates, from the user terminal.

4. The radio base station according to claim 1, wherein the radio base station comprises a WLAN radio transceiver configured to transmit/receive WLAN radio signals to/from the user terminal, and the data of the user terminal is transmitted or received via the WLAN radio transceiver in the specific mode.

5. The radio base station according to claim 1, wherein the controller is configured to:
switch the bearer from the cellular communication to the WLAN communication of the specific mode, and maintain setting of the PDCP layer without changing the setting, even if the bearer is switched from the cellular communication to the WLAN communication of the specific mode.

6. The radio base station according to claim 1, wherein, in the response to the specific mode being applied to the received data, the controller is configured to transmit the received data from the upper layer to the PDCP layer without passing through the cellular lower layer.

7. A processor communicatively coupled to memory containing stored instructions, the processor and memory for operating a radio base station for supporting cellular communication and wireless local area network (WLAN) communication, wherein a protocol stack for the cellular communication includes:
a cellular lower layer including a physical layer and a medium access control (MAC) layer; and a cellular upper layer higher than the MAC layer, wherein the cellular upper layer includes a packet data convergence protocol (PDCP) layer,
the processor is configured to execute the stored instructions to perform processes of
transmitting/receiving cellular radio signals to/from a user terminal,
setting a specific mode in which the PDCP layer of the cellular upper layer transmits or receives data to/from the user terminal via a protocol stack of the WLAN communication,
transmitting, to the user terminal via the cellular radio transceiver, bearer identification information that specifies a bearer to which the specific mode should be applied,
receiving the data from the user terminal via the protocol stack of the WLAN communication,
determining whether the specific mode is applied to the received data based on whether a WLAN-related identifier included in the received data matches with a WLAN-related identifier of a plurality of WLAN-related identifiers stored in storage of the radio base station, wherein the WLAN-related identifier included in the received data is used for the WLAN communication, and
in response to the specific mode being applied to the received data, processing the received data at the PDCP layer.

8. The processor according to claim 7, wherein the processor is configured to execute the stored instructions to perform processes of transmitting/receiving WLAN radio signals to/from the user terminal, and transmitting or receiving the data of the user terminal in the specific mode.

9. The processor according to claim 7, wherein the processor is configured to execute the stored instructions to perform processes of:
Switching the bearer from the cellular communication to the WLAN communication of the specific mode, and maintaining setting of the PDCP layer without changing the setting, even if the bearer is switched from the cellular communication to the WLAN communication of the specific mode.

10. The processor according to claim 7, wherein, in the response to the specific mode being applied to the received data, the processor is configured to execute the stored instructions to perform a process of transmitting the received data from the upper layer to the PDCP layer without passing through the cellular lower layer.

11. A communication control method used in a radio base station for supporting cellular communication and wireless local area network (WLAN) communication and including a cellular radio transceiver configured to transmit/receive cellular radio signals to/from a user terminal, wherein a protocol stack for the cellular communication includes:
a cellular lower layer including a physical layer and a medium access control (MAC) layer; and a cellular upper layer higher than the MAC layer, wherein the cellular upper layer includes a packet data convergence protocol (PDCP) layer,
the communication control method comprises steps of:
setting a specific mode in which the PDCP layer of the cellular upper layer transmits or receives data to/from the user terminal via a protocol stack of the WLAN communication;
transmitting, to the user terminal via the cellular radio transceiver, bearer identification information that specifies a bearer to which the specific mode should be applied,
receiving the data of the user terminal via the protocol stack of the WLAN communication,
determining whether the specific mode is applied to the received data based on whether a WLAN-related identifier included in the received data matches with a WLAN-related identifier of a plurality of WLAN-related identifiers stored in storage of the radio base station, wherein the WLAN-related identifier included in the received data is used for the WLAN communication, and
in response to the specific mode being applied to the received data, processing the received data at the PDCP layer.

12. The communication control method according to claim 11, wherein the radio base station includes a WLAN radio transceiver configured to transmit/receive WLAN radio signals to/from the user terminal, and the data of the user terminal is transmitted or received via the WLAN radio transceiver in the specific mode.

13. The communication control method according to claim 11, comprising the steps of:
switching the bearer from the cellular communication to the WLAN communication of the specific mode, and maintaining setting of the PDCP layer without changing the setting, even if the bearer is switched from the cellular communication to the WLAN communication of the specific mode.

14. The communication control method according to claim 11, wherein in the response to the specific mode being applied to the received data, the method further comprises transmitting the received data from the upper layer to the PDCP layer without passing through the cellular lower layer.

* * * * *